United States Patent [19]

Gerhard

[11] Patent Number: 4,907,908

[45] Date of Patent: Mar. 13, 1990

[54] ADJUSTABLE ROD JOINT

[75] Inventor: Helmut Gerhard, Siegen, Fed. Rep. of Germany

[73] Assignee: Siegenia-Frank KG, Siegen, Fed. Rep. of Germany

[21] Appl. No.: 114,130

[22] Filed: Oct. 28, 1987

[51] Int. Cl.⁴ .................................................. B25G 3/36
[52] U.S. Cl. .................................... 403/393; 403/380; 74/586
[58] Field of Search ................... 74/586, 588; 403/363, 403/380, 393; 29/432.2

[56] References Cited

U.S. PATENT DOCUMENTS 1,652,677 12/1927 McCoy et al. ................... 74/586 X

FOREIGN PATENT DOCUMENTS 1107102 5/1961 Fed. Rep. of Germany ........ 74/586
7603047 6/1976 Fed. Rep. of Germany .
2635446 2/1978 Fed. Rep. of Germany .
2635708 2/1978 Fed. Rep. of Germany .
8324586 12/1983 Fed. Rep. of Germany .
515486 12/1939 United Kingdom ................ 403/363

Primary Examiner—Andrew V. Kundrat
Attorney, Agent, or Firm—Gerry A. Blodgett; Norman S. Blodgett

[57] ABSTRACT

A longitudinally adjustable rod coupling 1, especially for connecting rod fittings for windows, doors, or the like, in which one connecting rod has a U-shaped coupling shoe with fine teeth at the insides of its legs. The other connecting rod is equipped on two narrow sides with a complementary fine teeth which can engage in the fine teeth of the shoe. The cross-section of the connecting rod is reduced in thickness in the region of the coupling shoe and correspondingly enlarged in width. The fine teeth have their profiles extending transversely over the total width of the portion of the connecting rod, section that is reduced in thickness. The lateral wings of the said connecting rod section that is reduced in thickness, which wings project beyond the width of the normal connecting rod cross-section, are bent approximately 90° to the plane of the connecting rods and form the legs of the coupling shoe.

7 Claims, 2 Drawing Sheets

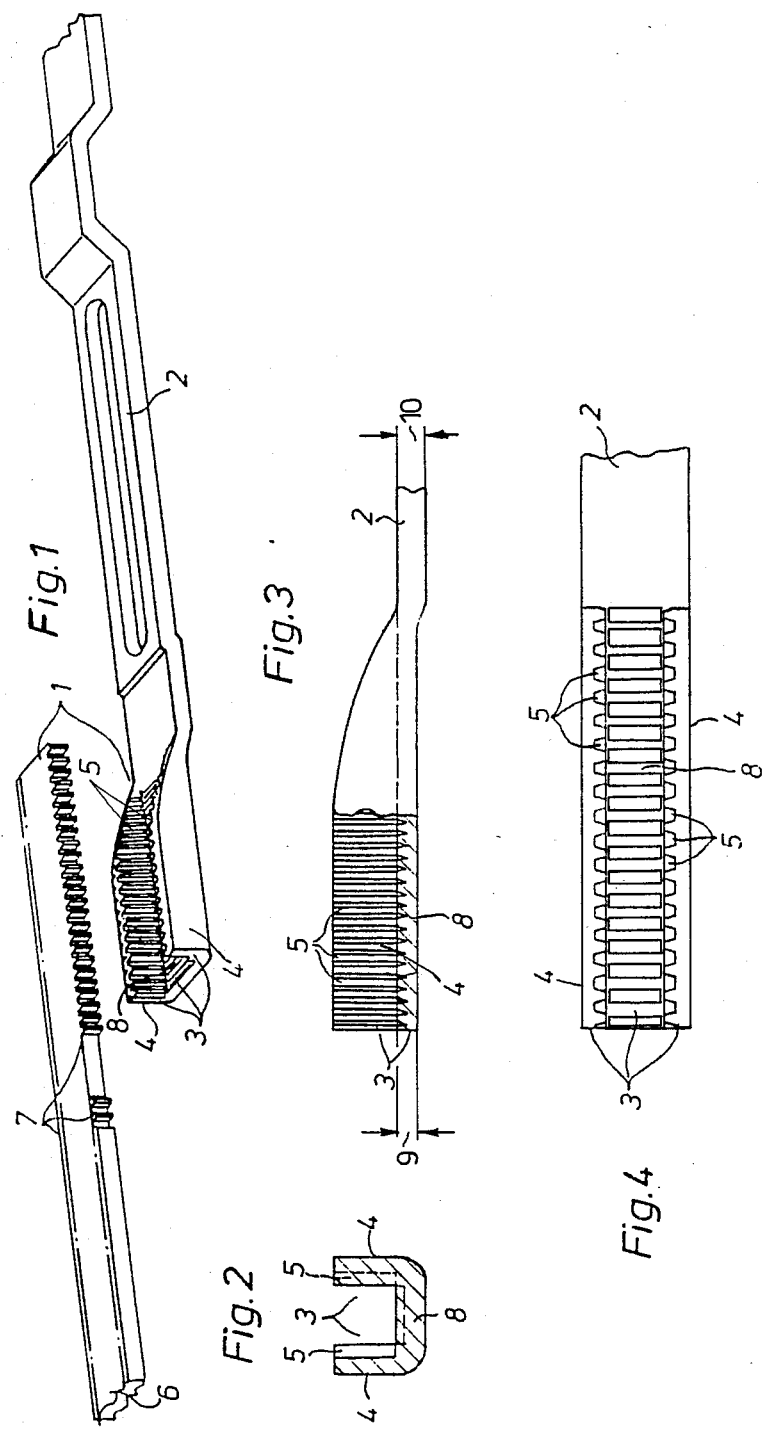

ADJUSTABLE ROD JOINT

BACKGROUND OF THE INVENTION

In forming longitudinally adjustable rod couplings, it has been proposed in German Gebrauchsmuster Patent No. 83 24 586 to use coupling shoes of the type that has become known through German Gebrauchsmuster Patent No. 76 03 047. Because in this situation the coupling shoes are subjected to constantly changing longitudinal shear forces, it has been shown that the coupling shoes are unavoidably subject to undesirable injuries or at least deformation which limit the useful life of the connecting rod fittings which are equipped with them.

It is the object of the invention to provide a rod coupling of this type which can be used for the fabrication of rods making use of a coupling shoe and which has as a starting material a flat material strip, especially a band steel strip which has a uniform width throughout its length. For this purpose, the coupling shoe is provided within the original width of the band material with U-legs which are integral with the rod and which project from one flat side. The U-legs are provided on their insides with fine teeth.

SUMMARY OF THE INVENTION

According to the present invention, the rod cross section thickness is reduced in the region of the coupling shoe and correspondingly enlarged in width, extending the fine teeth transversely over the entire width of the rod section that is reduced in thickness. Lateral wings are formed from the connecting rod section that is reduced in the thickness beyond the width of the normal cross-section of the connecting rod and are bent vertically of the plane of the connecting rod by approximately 90°.

It has been found that the lateral wings extending beyond the normal width of the connecting road cross-section, which wings are required for forming the U-legs of the coupling shoe, can be formed by flattening a short end section of the starting material and can be provided with the fine teeth without impairing the use of the coupling shoe by doing so. The consolidation of the material that is brought about by the flattening ensures that the U-shaped coupling shoe has (even with a wall thickness that is reduced compared to the normal cross-section of the connecting rod) a stability of shape that is higher than would be the case with webs formed like a strap from the plane of the flat material over its surface.

It has proved to be especially beneficial when the total thickness of the rod section that has been reduced in thickness is equal to approximately twice the profile height of the fine teeth, so that the profile height of the fine teeth is equal to approximately one-third of the thickness of the normal rod cross section.

It has proved to be additionally beneficial when the augmented right of the rod section that has been reduced in thickness, created by folding up the lateral wings, is dimensioned to be at least approximately twice as large as the thickness of the normal rod cross section. In this way it is possible to make the two legs of the U-shaped coupling shoe extends vertically above the surface of the rod by an amount which corresponds approximately to its normal cross-sectional thickness. The adjacent rod which is brought into engagement with the coupling shoe and which is provided on its narrow side with fine teeth can, therefore, be embraced by the coupling shoe over its total cross-sectional height.

Another feature of the rod coupling of the invention resides in the fact that the profile of the fine teeth is at least partially flattened in the web section of the coupling shoe that lies parallel to the normal cross-section of the rod in order to enlarge the contact surface of the neighboring rod that is engaged in the coupling shoe.

The method of the invention for the fabrication of the longitudinally adjustable rod coupling is distinguished mainly by the fact that the tooth profile of the fine teeth is directly formed during the flattening of the cross-section of the rod and the subsequent raising of the two lateral wings of the flattened cross-sectional area to positions at right angles to the rod plane.

Furthermore, the flattened cross-section of the rod (with its lateral sides displaying the teeth) is offset to at least approximately correspond to the plane of the adjacent surface of the normal cross-section of the rod.

Finally, from the aspect of production engineering, it has proved to be especially advantageous when the staring material is flattened to twice the total length of a coupling shoe, is provided with the teeth, and is then subjected to a separation cut on one-half of the length of the teeth to form two mirror image coupling shoes. This can be done either before the lateral wings of the flattened rod cross-section are vertically offset into the U-shape, or after they have first been offset.

BRIEF DESCRIPTION OF THE DRAWINGS

The character of the invention, however, may be best understood by reference to one of its structural forms, as illustrated by the accompanying drawings, in which:

FIG. 1 is a perspective exploded view of a longitudinally adjustable rod joint with a coupling shoe, FIG. 2 shows is cross-sectional view of the coupling shoe, FIG. 3 is a side view of the coupling shoe with portions broken away, FIG. 4 is a top plane view of the coupling shoe.

DESCRIPTION OF THE PREFERRED EMBODIMENT

Figure 5:
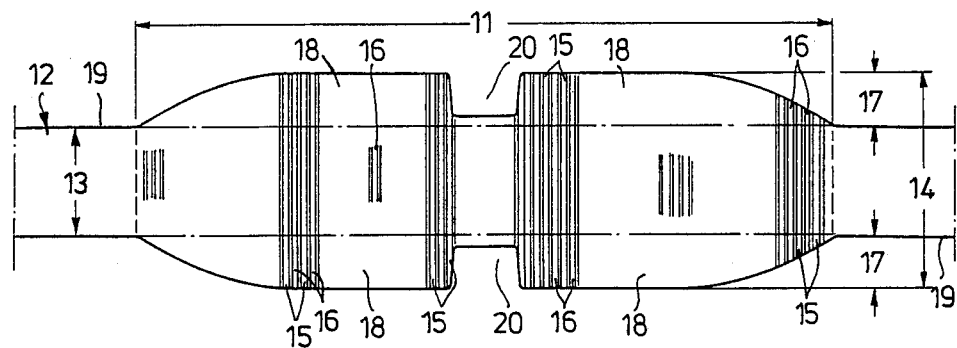
FIGS. 5 to 7 show the coupling shoe during three production steps for its fabrication; two shoes are being fabricated at once.

FIG. 1 of the drawing shows an adjustable rod joint 1 with a first rod forming a connecting rod 2. The connecting rod 2 has at its free end an upwardly-open coupling shoe 3 with a cross-section of approximately U-shape, which coupling shoe is provided on the inside surfaces of at least one (but preferably of both) legs 4 with a fine teeth 5 whose tooth profiles extend essentially transversely of the length of the connecting rod 2.

A second rod system, such as a connecting rod 6, consists of flat material of rectangular cross section which is provided on one (but preferably on both) narrow sides with fine teeth 7 which are complementary to the fine teeth 5. The connecting rod 6 can engage the shoe 3 from above at any optional position of its longitudinal area provided with the fine teeth 7. This is done in a form-locking manner with the fine teeth 5 of the U-shaped coupling shoe 3 on the connecting rod 2. Since the connecting rod 6 is embraced on its narrow sides by the two legs 4 of the coupling shoe 3, the shear forces that result during the longitudinal movement of the connecting rods 2 and 6 together can be taken up reliably by the coupling shoe 3 without the coupling connection becoming disengaged.

It is essential that the longitudinally adjustable rod coupling 1 shown in FIG. 1 be constructed so that the U-shaped coupling shoe 3 be integrally formed and of the same material as the connecting rod 2, i.e. of band steel strip. It is important that the connecting rod 2 and coupling shoe 3 be fabricated in one piece, in such a manner that the bottom surface of the web 8 of the coupling shoe 3 can lie in the same plane as the upper surface of the connecting rod 2.

The connecting rod 2 and the coupling shoe 3 are fabricated together as a punched or stamped part, so that the entire coupling shoe 3 is made at one time with its two legs 4, the bottom or web 8, and the fine teeth 5 in one action of a stamping press.

The press action is carried out on a given longitudinal section 11 (FIG. 5) of a band steel strip 12 or the like which forms the starting material and which has a uniform width 13 along its entire length, which width agrees with the cross-sectional width of the connecting rod 2.

By means of the press action, the band steel strip 12 is reduced in its cross-sectional thickness along the longitudinal section 11 in such a way that it takes on a cross-sectional width 14 which has a dimension approximately twice as large as the starting width 13 of the band steel strip 12.

During this press action, there also are simultaneously formed tooth gaps 15 defining fine teeth 5, these gaps being in the form of sunken press marks formed in the reduced material thickness of the longitudinal section 11. This is done in such manner that the top faces of the teeth 16 rising between two successive tooth gaps, 15 remain in the plane of the longitudinal section 11 whose cross-sectional thickness is reduced.

The tooth gaps 15, when they are first formed during the press action, extend across the entire width 14 of the reduced-thickness longitudinal section 11, as can clearly be seen in portions of FIG. 5. (Only a few of the teeth and gaps are shown.)

Figure 6:
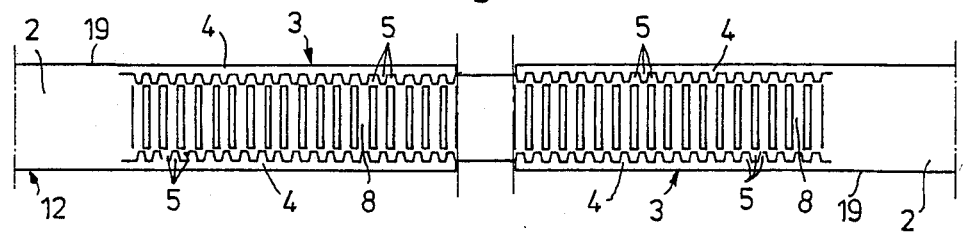

During a work step immediately following the press action, the lateral wings 18 of the longitudinal section 11 (that project from both sides beyond the dimension 17 and beyond the normal cross-sectional width 13 of the band steel strip 12) are bent upwardly from the normal cross-sectional plane at least approximately 90°, so that the two legs 4 of the coupling shoe 3 are created thereby with the fine teeth 5 lying on the inside, as can be seen in FIG. 6.

The raising of the lateral wings 18 has a beneficial function, because the outside surfaces of the two legs 4 of the coupling shoe 3 come to lie (at least approximately) in complete alignment with the narrow sides 19 of the band steel strip 12 of the connecting rod 2.

In order to raise the lateral wings 18 of the coupling shoe 3, it is possible to use a punch that is essentially designed with a flat front face to accomplish the bending of the lateral wings, but with profiles on its longitudinal surfaces which correspond to the tooth gaps 15 and the teeth 16. This flat front face is the part of the punch which is in contact with the web 8 during the punching process. The longitudinal surfaces are those surfaces which, on the other hand, contact the lateral wings during the punching process. The profiles thereon consist of alternating grooves and raised elements, shaped and spaced similarly to the teeth 16 and the gaps 15. During punching, the teeth fit into the grooves and the raised elements into the gaps, while the flat front face contacts teeth and gaps together in the web area. In this way the raising of the lateral wings 18 to form the legs 4 of the coupling shoe 3 accomplishes several things at once. Their inside fine teeth 5 maintain, during the bending action, their exact transverse alignment to the longitudinal axis of the connecting rod. On the other hand, however, the teeth 16 that remain in the range of the bottom or web 8 of the coupling shoe 3 become at least partially flattened by the flat front surface of the punch, so that their head faces broaden out against the top faces of the corresponding portions of the fine teeth 5, while the tooth gaps 15 in that region become correspondingly narrowed (FIG. 3) or even partially obliterated as shown in FIG. 5.

The bending tool effecting the bending of the lateral wings 18 to form the legs 4 of the coupling shoe 3 can be designed in such a way that it offsets the bottom or web 8 of the coupling shoe 3 relative to the lower surface of the band material strip 12 of the connecting rod 2 upwardly far enough that the inner surface of the bottom or web 8 reaches the same plane as the adjacent upper surface of the band material strip 12 or the connecting rod 2.

Figure 7:
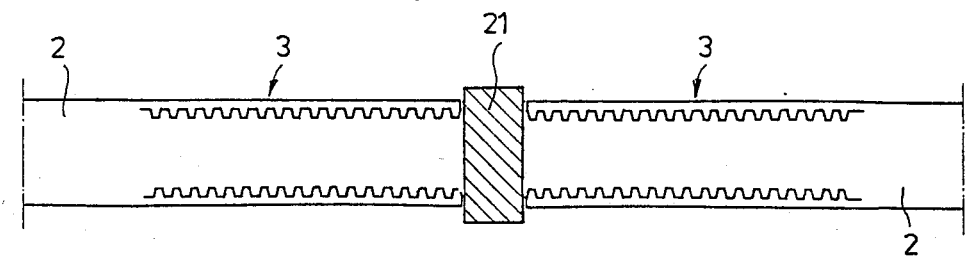

FIGS. 5 and 6 show a particularly advantageous fabrication method for making connecting rods 2 equipped in one piece with a coupling shoe 3. More specifically, the longitudinal section 11 that is flattened and broadened by the press action is so dimensioned that it permits the simultaneous formation of two coupling shoes 3 with adjoining connecting rods 2. This requires that care be taken that upon half the length of the longitudinal section 11 there lie in the lateral wings 18 relief spaces 20 in the area, so that the offset legs 4 of the coupling shoes 3 are interrupted. In this region a separation knife 21 can then become effective, as is indicated in FIG. 7. After the cutting stroke, two connecting rods 2 each with a coupling shoe 3 have in this way been fabricated in mutually mirror-inverted position.

The development of the coupling shoe 3 on such a connecting rod 2 is shown in the FIGS. 2 to 4 of the drawing in each case on an enlarged scale. In particular, it can be seen that the effective thickness 9 of the bottom or web 8 at the coupling shoe 3 corresponds to about two-thirds of the material thickness of the connecting rod 2. Beyond this it is clear, especially from FIG. 2 and 4, that the tooth gaps 15 of the fine teeth 5 have a depth (and consequently the teeth 16 have a height) which corresponds to approximately to one-half of the thickness 9 of the legs 4 of the coupling shoe 3.

Finally, FIG. 3 shows that, because of the flattening of the teeth 16 on the bottom web 8 of the coupling shoe 3, their top faces together form an enlarged supporting surface for the connecting rod 6 which is to be inserted, because a narrowing of the tooth gaps 15 existing between the teeth 16 has been created.

When a relatively short rod, especially with connecting rod 2, is used, it can also be fabricated from band steel strips transversely of their longitudinal direction with their normal cross-sectional width before the press action is carried out on them. The punch presses used for the fabrication of these short rod systems or connecting rods can operate in this case with large numbers of strokes and, thus, allow economical mass production.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Adjustable rod joint, especially for connecting rod fittings for windows, doors or the like, on which the end of one of two rods having an original width and thickness which are to be coupled with one another is provided with a U-shaped coupling shoe designed as a stamped part having legs (4) and a web section (8) and which is provided on the inside of at least one leg with fine teeth (5) formed during the fabrication, while the other rod has, at least on a narrow side intended for coupling, over a large longitudinal area complementary fine teeth with which it can be inserted between the legs of the coupling shoe, and in which the fine teeth of the coupling shoe have been formed by stamp pressing, characterized by the fact that, the coupling shoe (3) is formed by an integral portion of the rod which has been reduced in thickness (10) and correspondingly enlarged (18) in its width (13) to form lateral wings, the fine teeth (5) extend transversely over a portion of the width (14) of the reduced thickness rod section (11), corresponding to at least one lateral wing and the lateral wings (18) which project beyond the width (13) of the original rod cross-section at the reduced rod section (11) are vertically bent approximately 90° to the plane of the rod to form legs (4).

2. Rod joint as recited in claim 1, wherein the total thickness of the reduced rod section (11) corresponds approximately to twice the height of the fine teeth (5) so that the height of the fine teeth (5) is approximately equal to one-third of the thickness (10) of the original cross-section of the rod (2).

3. Rod joint as recited in claim 1, wherein the extended width (14) of the portion of the rod (11) that is reduced (9) in its thickness (10) is dimensioned to be approximately twice as large as the width (13) of the original cross-section of the rod.

4. Rod joint as recited in claim 1, wherein the profile (16) of the fine teeth (5) is at least partially flattened in the web section (8) of the coupling shoe (3) which is parallel to the original cross-section (13) of the rod.

5. A method of forming a coupling shoe for an adjustable rod joint on a piece of connecting rod material having original width and thickness, comprising the steps of:
    (a) pressing a section of the connecting rod material to reduce its original thickness and increase its original width to form lateral wings,
    (b) simultaneously with (a), pressing tooth gaps finding teeth at least across a portion of the pressed section of the material corresponding to one of the lateral wings, and
    (c) bending at least those portions of the lateral wings which project beyond the original width of the connecting rod material approximately 90° to the plane of the rod to form legs.

6. A method as recited in claim 5 wherein the connecting rod material has a plane surface and further comprising the step of:
    (d) crimping the surface of the section of the rod material which has been pressed so that it is approximately in the same plane as the adjacent surface of the connecting rod material which has the original width and thickness.

7. A method as recited in claim 6 wherein the method is carried out on a piece of connecting rod material having a length corresponding to two connecting rods wherein the original pressing is carried out upon a portion of the connecting rod material corresponding to twice the length of a coupling shoe and comprising the further step of performing a separation cut near the center of the pressed section to form two connecting rods with integrally formed coupling shoes.

* * * * *